US010662271B2

(12) United States Patent
Savo et al.

(10) Patent No.: US 10,662,271 B2
(45) Date of Patent: *May 26, 2020

(54) DROPLETS DISTRIBUTED IN AN AQUEOUS MEDIUM

(71) Applicant: DDP SPECIALTY ELECTRONIC MATERIALS US 8, LLC, Collegeville, PA (US)

(72) Inventors: Andrew M. Savo, Cherry Hill, NJ (US); Matthew D. Reichert, Minneapolis, MN (US); John David Finch, North Wales, PA (US); Lester H. Mcintosh, III, Green Lane, PA (US); Robert Johnson, Carmel, IN (US); Alfred K. Schultz, Maple Glen, PA (US)

(73) Assignee: DDP SPECIALTY ELECTRONIC MATERIALS US 8, LLC, Collegeville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/060,180

(22) PCT Filed: Dec. 15, 2016

(86) PCT No.: PCT/US2016/066863
§ 371 (c)(1),
(2) Date: Jun. 7, 2018

(87) PCT Pub. No.: WO2017/112516
PCT Pub. Date: Jun. 29, 2017

(65) Prior Publication Data
US 2018/0362687 A1   Dec. 20, 2018

Related U.S. Application Data

(60) Provisional application No. 62/270,729, filed on Dec. 22, 2015.

(51) Int. Cl.
*C08F 216/06* (2006.01)
*C08F 2/20* (2006.01)
*C08J 3/07* (2006.01)
*C08J 3/24* (2006.01)
*C08F 230/06* (2006.01)

(52) U.S. Cl.
CPC .............. *C08F 216/06* (2013.01); *C08F 2/20* (2013.01); *C08J 3/07* (2013.01); *C08J 3/24* (2013.01); *C08F 230/06* (2013.01); *C08F 2810/20* (2013.01); *C08J 2329/04* (2013.01)

(58) Field of Classification Search
CPC ................................. C08J 3/07; C08F 230/06
See application file for complete search history.

(56) References Cited

U.S. PATENT DOCUMENTS

| 3,565,818 | A | 2/1971 | Bayless |
| 4,427,794 | A | 1/1984 | Lange et al. |
| 6,156,245 | A | 12/2000 | Takebayashi et al. |
| 7,495,041 | B2 | 2/2009 | Nakano et al. |
| 8,646,907 | B2 | 2/2014 | Zhang et al. |
| 8,664,332 | B2 | 3/2014 | Deetz et al. |
| 2003/0152718 | A1 | 8/2003 | Hamamoto et al. |
| 2004/0186405 | A1 | 9/2004 | Pinna et al. |
| 2014/0264984 | A1 | 9/2014 | Kosvintsev |
| 2015/0140439 | A1 | 5/2015 | Hasegawa |

FOREIGN PATENT DOCUMENTS

| CN | 102558463 A | 7/2012 |
| GB | 816579 A | 7/1959 |
| JP | 48101476 | 12/1973 |
| JP | 52000884 | 1/1977 |
| KR | 101277476 B1 | 6/2013 |
| RU | 2229129 C1 | 5/2004 |
| WO | 2004106457 A2 | 12/2004 |
| WO | 2015138164 A1 | 9/2015 |

OTHER PUBLICATIONS

Haddleton, et al., "Catalytic Chain Transfer Polymerisation (CCTP) to Multi Arm Star Block Copolymers" Polymer Preprints, vol. 51, No. 1 p. 310 (2010).
Dhal, "Investigation of Molecular and Chiroptical Characteristics of Optically Active Functional Vinyl Copolymers Possessing Main-Chain Chirality", J. Polymer Science, vol. 30, pp. 1633-1646 (1992).
Bromba, et al., "Phenyl boronic acid complexes of diols and hydroxyacids", Dept. of Chemistry, U of Victoria, Canada, http://citeseerx.ist.psu.edu/viewdoc/summary., pp. 1-18.

*Primary Examiner* — Mark S Kaucher
(74) *Attorney, Agent, or Firm* — Carl P. Hemenway; Kenneth Crimaldi

(57) ABSTRACT

Provided is a method of making droplets distributed in an aqueous medium comprising bringing into contact
(i) an organic solution comprising 0.002% or more of one or more boronic acids, by weight based on the weight of the organic solution, and
(ii) an aqueous solution comprising polyvinyl alcohol.

9 Claims, No Drawings

DROPLETS DISTRIBUTED IN AN AQUEOUS MEDIUM

Suspensions in aqueous media of liquid droplets of water-insoluble compounds are useful for a variety of purposes. For example, when such droplets contain vinyl monomer and initiator, the monomer may undergo polymerization to form polymer particles in a process of suspension polymerization. Such polymer particles are useful for a variety of purposes, including, for example, as resins that are adsorptive or that are functionalized to have ion exchange capability or both. Such resins are used for a wide variety of purposes, including, for example, purification of foods and/or beverages.

In the past, suspensions in aqueous media of liquid droplets of water-insoluble vinyl monomers have been stabilized by the addition of one or more stabilizing compound. One common stabilizing compound is gelatin. Because gelatin is a product derived from animals, many consumers do not wish to purchase or consume foods or beverages that were processed using methods that included contact with resins that were made using gelatin. Typically, when gelatin is used, the suspension also contains one or more costabilizers. Typical costabilizers are water-soluble polymers.

U.S. Pat. No. 8,646,907 describes contact lenses in which the lens surface contains at least one form of boronic acid, boronic ester, boronic anhydride, or a combination thereof, present on at least a surface of the lens body, and in which the boronic acid moieties are complexed with polyhydric alcohol.

It is desired to provide a method that produces droplets distributed in an aqueous medium, where that method has one or more of the following benefits: the method is performed without the use of gelatin or other animal products; the method produces a stable suspension of droplets distributed in an aqueous medium; the droplets distributed in the aqueous medium are suitable for suspension polymerization; and the result of performing such an aqueous polymerization is polymer beads of uniform size distribution.

The following is a statement of the invention.

A first aspect of the present invention is a method of making droplets distributed in an aqueous medium comprising bringing into contact
  (i) an organic solution comprising one or more boronic acids, and
  (ii) an aqueous solution comprising polyvinyl alcohol A second aspect of the present invention is a composition comprising droplets distributed in an aqueous medium, wherein the droplets comprise one or more boronic acids, and wherein the aqueous medium comprises polyvinyl alcohol.

A third aspect of the present invention is a method of suspension polymerization comprising
  (I) providing a composition comprising droplets distributed in an aqueous medium, wherein the droplets comprise one or more boronic acids, one or more monomers, and one or more initiators, and wherein the aqueous medium comprises polyvinyl alcohol; and
  (II) stressing the composition so that the initiator initiates polymerization of the monomer.

The following is a detailed description of the invention.

As used herein, the following terms have the designated definitions, unless the context clearly indicates otherwise.

A spherical particle is characterized by its diameter. If a particle is not spherical, its diameter is taken to be the diameter of a sphere having the same volume as the particle.

A composition is considered herein to be a liquid if it is in the liquid state over a temperature range that includes 15° C. to 40° C.

Ambient conditions herein refer to conditions that normally occur in the environment. Ambient conditions include temperature of approximately 23° C. and pressure of approximately 1 atmosphere pressure. Ambient conditions also include conditions in which stressful conditions such as ionizing radiation, ultraviolet radiation, reactive chemicals, etc., are either absent or are present at levels found in the normal environment.

Droplets are discrete particles that contain one or more liquids. The amount of liquid in the droplet is 80% or more by weight based on the weight of the droplets. A collection of droplets has harmonic mean size of 25 µm to 2,000 µm.

An aqueous medium is a liquid that contains 40% or more water by weight based on the weight of the aqueous medium. Substances dissolved as individual molecules in the aqueous medium are considered to be part of the aqueous medium. Substances that are present as discrete particles are said to be distributed in an aqueous medium if 50% or more, by count, of the discrete particles are surrounded by the aqueous medium. Particles that are distributed in an aqueous medium may be in the form, for example, of a suspension, a dispersion, an emulsion, a latex, or a combination thereof. A composition in a container that contains particles and contains an aqueous medium and that is being subjected to mechanical agitation is considered to have particles distributed in the aqueous medium if the particles meet the above criterion, even if mechanical agitation is required to prevent the particles from settling to the bottom of the container, floating to the top of the container, coagulating with each other, agglomerating with each other, or otherwise coming into a non-distributed configuration.

An organic solution is a liquid that contains 20% or less water by weight based on the weight of the organic medium. An organic solution contains 2 or more different chemical compounds. All of the compounds present in an organic solution are intimately mixed with each other on a molecular level.

A boronic acid is a compound having structure I:

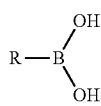

where R is a chemical group that contains one or more carbon atom. The boron atom shown in structure I is bonded to a carbon atom in the group R. Boronic acid may be in the protonated form as shown in structure I or in an anion form, with one or both of the hydrogen atoms shown in structure I removed.

"Resin" as used herein is a synonym for "polymer." A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. Polymers have weight-average molecular weight of 2,000 or more Molecules that can react with each other to form the repeat units of a polymer are known herein as "monomers." The repeat units so formed are known herein as "polymerized units" of the monomer.

Vinyl monomers have the structure II

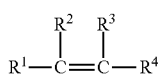

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Vinyl monomers have molecular weight of less than 1,000. Vinyl monomers include, for example, styrene, substituted styrenes, dienes, ethylene, ethylene derivatives, and mixtures thereof. Ethylene derivatives include, for example, unsubstituted and substituted versions of the following: vinyl acetate and acrylic monomers. Acrylic monomers are monomers selected from substituted and unsubstituted (meth)acrylonitrile, (meth)acrylic acid, substituted and unsubstituted alkyl esters of (meth)acrylic acid, substituted and unsubstituted amides of (meth)acrylic acid, and mixtures thereof. As used herein, the prefix "(meth)acryl-" means either acryl- or methacryl-. "Substituted" means having at least one attached chemical group such as, for example, alkyl group, alkenyl group, vinyl group, hydroxyl group, alkoxy group, carboxylic acid group, phosphoric acid group, sulfonic acid group, amino group, substituted amino group, other functional groups, and combinations thereof.

As used herein, vinyl aromatic monomers are vinyl monomers in which one or more of $R^1$, $R^2$, $R^3$, and $R^4$ contain one or more aromatic ring.

A monovinyl monomer is a vinyl monomer that has exactly one non-aromatic carbon-carbon double bond per molecule. A multivinyl monomer is a vinyl monomer that has two or more non-aromatic carbon-carbon double bonds per molecule.

A vinyl polymer is a polymer in which 90% or more of the polymerized units, by weight based on the weight of the polymer, are polymerized units of one or more vinyl monomers. An acrylic polymer is a vinyl polymer in which 50% or more of the polymerized units, by weight based on the weight of the polymer, are polymerized units of acrylic monomers. A vinyl aromatic polymer is a polymer in which 50% or more of the polymerized units, by weight based on the weight of the polymer, are polymerized units of vinyl aromatic monomer.

Polyvinyl alcohol (PVOH) has the nominal structure III

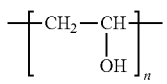

where n is 100 or more. Also, 0 to 20 mole % of the linkages between polymerized units are in the head-to-tail configuration, which is —[—$CH_2$—C(X)H—]—[—C(X)H—$CH_2$—]—, and 80 mole % to 100 mole % of the linkages between polymerized units are in the head-to-head configuration, which is —[—$CH_2$—C(X)H—]—[—$CH_2$—C(X)H—]—, where each X is, independently, —OH or —OC(O)$CH_3$. Typically, PVOH is made by polymerization of vinyl acetate followed by hydrolysis of 75 mole % to 100 mole % of the polymerized units to convert the acetate group to a hydroxyl group.

PVOH is characterized by the parameter "% hydrolyzed," which is the mole % of the polymerized units that have the composition shown in structure III, either in the head-to-head configuration or the head-to-tail configuration. PVOH is 75% to 100% hydrolyzed. It is considered that the polymerized units that are not hydrolyzed have the composition —$CH_2$—C(X)H—, where X is —OC(O)$CH_3$.

As used herein, an initiator is a molecule that is stable at ambient conditions but that is capable under certain conditions of producing one or more fragments that bears a free radical, and that fragment is capable of interacting with a monomer to start a free radical polymerization process. The conditions that cause production of a fragment bearing a free radical include, for example, elevated temperature, participation in an oxidation-reduction reaction, exposure to ultraviolet and/or ionizing radiation, or a combination thereof.

A collection of particles is characterized by the diameters of the particles. A collection of particles is characterized herein by the parameters D10, D50, and D60. D10 is the value such that exactly 10% of the collection of particles by volume have diameter of D10 or less. D50 is the value such that exactly 50% of the collection of particles by volume have diameter of D50 or less. D60 is the value such that exactly 60% of the collection of particles by volume have diameter of D60 or less. The parameters D10, D50, and D60 are determined by mixing a sample of the collection of particles into water to form a dilute slurry and using laser light scattering to determine D10, D50, and D60.

A collection of particles may also be characterized by the uniformity coefficient (UC), which is defined herein as UC=D60/D10. Another useful characterization of a collection of particles is "LT355," which is the percent by volume of the particles having diameter less than 355 µm.

The harmonic mean size (HMS) of a collection of particles is given by the formula $$HMS = N / \sum_{i=1}^{N} \left( \frac{1}{d_i} \right)$$

where $d_i$ is the diameter of an individual particle, the summation index i is taken over the individual particles, and N is the number of particles.

The present invention involves one or more boronic acids. Preferred boronic acids have structure I shown above where the R group contains one or more aromatic ring. More preferably, the boron atom shown in structure I is bonded to a carbon atom that is a member of an aromatic ring in the R group. More preferably, the R group has the structure IV

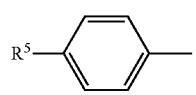

where $R^5$ is an alkyl or alkenyl group; preferably $R^5$ has 1 to 6 carbon atoms. More preferably, the R group is phenyl or a substituted phenyl group. More preferred boronic acids are phenyl boronic acid, butylphenyl boronic acid, 4-vinylphenyl boronic acid, and mixtures thereof; more preferred is 4-vinylphenyl boronic acid.

The boronic acid is dissolved in an organic solution. Preferably, boronic acid is present in the organic solution in an amount, by weight based on the weight of the organic solution, of 0.002% or more; more preferably 0.004% or more; more preferably 0.006% or more. Preferably, boronic acid is present in the organic solution in an amount, by weight based on the weight of the organic solution, of 0.1% or less; more preferably 0.05% or less; more preferably 0.03% or less; more preferably 0.02% or less.

Preferably, the organic solution contains one or more monomers.

Preferred monomers are vinyl monomers. Preferred vinyl monomers are styrenic monomers, acrylic monomers, and mixtures thereof. Preferably, all the monomers used are selected from vinyl aromatic monomers, acrylic monomers, and mixtures thereof; more preferably selected from vinyl aromatic monomers. More preferably, all the monomers used are selected from vinyl aromatic monomers. Preferably, the vinyl monomer includes one or more monofunctional vinyl monomer. Preferred monofunctional vinyl monomers are acrylic and styrenic monofunctional monomers; more preferred are monofunctional styrenic monomers; more preferred is styrene. Preferably, the vinyl monomer includes one or more multifunctional vinyl monomer. Preferred multifunctional vinyl monomers are multifunctional styrenic monomers; more preferred is divinyl benzene.

Preferably, little or no vinyl chloride is present. Preferably, the amount of vinyl chloride is, by weight based on the total weight of all monomers, 0 to 0.1%, more preferably 0 to 0.01%; more preferably 0%.

Preferably, the amount of monovinyl monomer in the organic solution, by weight based on the weight of the organic solution, is 20% or more; more preferably 50% or more; more preferably 70% or more; more preferably 80% or more; more preferably 84% or more; more preferably 88% or more. Preferably, the amount of monovinyl monomer in the organic solution, by weight based on the weight of the organic solution, is 99.9% or less; more preferably 99% or less; more preferably 98% or less; more preferably 96% or less; more preferably 94% or less; more preferably 92% or less.

Preferably, the amount of multivinyl monomer in the organic solution, by weight based on the weight of the organic solution, is 0.1% or more; more preferably 0.5% or more; more preferably 1% or more; more preferably 2% or more; more preferably 4% or more; more preferably 6% or more; more preferably 8% or more. Preferably, the amount of multivinyl monomer in the organic solution, by weight based on the weight of the organic solution, is 80% or less; more preferably 50% or less; more preferably 30% or less; more preferably 25% or less; more preferably 20% or less; more preferably 16% or less; more preferably 12% or less.

The organic solution preferably contains one or more initiators. Preferred initiators have solubility in 100 mL of water at 25° C. of 1 gram or less; more preferably 0.5 gram or less; more preferably 0.2 gram or less; more preferably 0.1 gram or less. Preferred are peroxide and hydroperoxide initiators; more preferred are peroxide initiators; more preferred are benzoyl peroxide and derivatives thereof; more preferred is benzoyl peroxide. Preferably the amount of initiator in the organic solution is, by weight based on the weight of the organic solution, 0.05% or more; more preferably 0.1% or more; more preferably 0.2%. Preferably the amount of initiator in the organic solution is, by weight based on the weight of the organic solution, 2% or less; more preferably 1% or less; more preferably 0.5% or less.

Optionally, the organic solution additionally contains sulfur. When sulfur is present, the preferred amount of sulfur is, by weight based on the weight of the organic solution, 0.001% or more. When sulfur is present, the preferred amount of sulfur is, by weight based on the weight of the organic solution, 0.02% or less.

The organic solution optionally contains one or more porogens. A porogen is a compound that is liquid at 25° C. and that has solubility in water at 25° C. of less than 0.5 grams per 100 grams of water. The porogen is soluble (in the amount present in the organic solution) at 25° C. in the organic solution. When monomer and porogen are both present in the organic solution, the porogen is preferably chosen so that the polymer that would be formed by polymerization of the monomer is not soluble in the porogen. That is, the solubility of such a polymer in the porogen at 25° C. is less than 1 gram per 100 grams of porogen. When porogens are present, preferred porogens are aliphatic hydrocarbons, aliphatic alcohols, aromatic esters, alkyl fatty acids, and mixtures thereof. In some embodiments, (herein "porogen rich" embodiments), the amount of porogen is 10% or more by weight based on the weight of the organic solution. In porogen rich embodiments, the amount of porogen, by weight based on the weight of the organic solution, is 10% or more; preferably 20% or more; more preferably 30% or more. In porogen rich embodiments, the amount of porogen, by weight based on the weight of the organic solution, is 60% or less; preferably 50% or less; more preferably 40% or less. In some embodiments (herein "porogen poor" embodiments), the amount of porogen is 5% or less by weight based on the weight of the organic solution. In porogen poor embodiments, the amount of porogen, by weight based on the weight of the organic solution, is 0 to 5%; preferably 0 to 2%; more preferably 0 to 1%; more preferably 0 to 0.1%; more preferably 0%.

Preferably, all of the ingredients present in the organic solution are intimately mixed with each other on a molecular level. To illustrate this statement, an illustrative embodiment may be considered that contains 0.01% boronic acid, 0.3% initiator, 10% multivinyl monomer, and the remainder is monovinyl monomer. In this embodiment, the monomers are all miscible with each other at the proportion used, and the remaining ingredients are dissolved in the monomer mixture.

Preferably, in the organic solution, the sum of the weights of all monomers, all initiators, all porogens, sulfur, and all boronic acids is, by weight based on the weight of the organic solution, 75% to 100%; more preferably 90% to 100%, more preferably 95% to 100%; more preferably 99% to 100%; more preferably 99.5% to 100%.

In porogen poor embodiments, preferably, the amount of monomer in the organic solution, by weight based on the weight of the organic solution, is 90% or more; more preferably 95% or more; more preferably 98% or more; more preferably 99% or more. Preferably, the amount of monomer in the organic solution, by weight based on the weight of the organic solution, is 99.9% or less.

The present invention involves an aqueous solution that contains PVOH. Preferably, the PVOH is dissolved in the aqueous solution. Preferably, the PVOH has degree of polymerization of 325 or higher; more preferably 700 or higher; more preferably 900 or higher. Preferably, the PVOH has degree of polymerization of 5,000 or lower.

Preferably, PVOH has % hydrolyzed of 80% or more; more preferably 85% or more. Preferably, PVOH has % hydrolyzed of 95% or less; more preferably 90% or less.

Preferably the amount of PVOH is, by weight based on the weight of the aqueous solution, 0.01% or higher; more preferably 0.02% or higher; more preferably 0.04% or higher. Preferably the total amount of PVOH is, by weight based on the weight of the water, 0.5% or less; more preferably 0.2% or less; more preferably 0.1% or less.

The aqueous solution optionally contains one or more cellulose derivative dissolved in the aqueous solution. Among cellulose derivatives, preferred is carboxymethyl methylcellulose (CMMC). When CMMC is present, the preferred amount is, by weight based on the weight of the aqueous solution, 0.01% or more; more preferably 0.02% or more; more preferably 0.05% or more; more preferably 0.1% or more. When CMMC is present, the preferred amount is, by weight based on the weight of the aqueous solution, 1% or less; more preferably 0.5% or less; more preferably 0.2% or less.

The aqueous solution preferably contains one or more nitrogen-containing inorganic salt dissolved in the aqueous solution. The inorganic salt has a cation and an anion. Preferred cations are sodium, potassium, and a mixture thereof; more preferred is sodium. Preferred anions are nitrite, nitrate, and a mixture thereof; more preferred is nitrite. The preferred amount of dissolved inorganic salt is, by weight based on the weight of the inorganic solution, 0.002% or higher; more preferably 0.005% or higher; more preferably 0.01% or higher. The preferred amount of dissolved inorganic salt is, by weight based on the weight of the inorganic solution, 0.2% or less; more preferably 0.1% or less; more preferably 0.05% or less; more preferably 0.02% or less.

Preferably, the amount of water in the aqueous solution is, by weight based on the weight of the aqueous solution, 90% or more; more preferably 95% or more; more preferably 99% or more; more preferably 99.5% or more. Preferably, the amount of water in the aqueous solution is, by weight based on the weight of the aqueous solution, 99.99% or less.

In the practice of the present invention, the aqueous solution and the organic solution are brought into contact with each other to form a mixture. Preferably, the amount of organic solution, by weight based on the weight of the mixture, is 10% or more; more preferably 15% or more; more preferably 20% or more. Preferably, the amount of organic solution, by weight based on the weight of the mixture, is 60% or less; more preferably 50% or less; more preferably 40% or less; more preferably 30% or less.

Preferably, the mixture is subjected to mechanical agitation. Preferably, subsequent to the mechanical agitation, the mixture has the form of droplets distributed in an aqueous medium. The resulting composition, in which droplets are distributed in an aqueous medium, is known herein as the suspension. Preferably, the volume fraction of droplets, based on the volume of the mixture, is 0.2 or more; more preferably 0.25 or more; more preferably 0.30 or more; more preferably 0.35 or more. Preferably, the volume fraction of droplets, based on the volume of the mixture, is 0.55 or less; more preferably 0.50 or less; more preferably 0.45 or less.

The mechanical agitation may be performed by any apparatus. Suitable methods of mechanical agitation include, for example, shaking, stirring, homogenizing, passing through a static mixer, jetting, and combinations thereof. Preferred is jetting. Suitable jetting methods are described in U.S. Pat. Nos. 4,444,960 and 4,623,706.

The suitable and preferred ingredients and amounts for the droplets are the same as those described above for the organic solution. The composition of the droplets may not be exactly identical to the composition of the organic solution that was used in the process of making the suspension.

The suitable and preferred ingredients and amounts for the aqueous medium are the same as those described above for the aqueous solution. The composition of the aqueous medium may not be exactly identical to the composition of the organic solution that was used in the process of making the suspension.

Preferably, the harmonic mean size of the droplets is 100 µm or larger; more preferably 200 µm or larger; more preferably 300 µm or larger; more preferably 400 µm or larger. Preferably, the harmonic mean size of the droplets is 2,000 µm or smaller; more preferably 1,500 µm or smaller; more preferably 1,000 µm or smaller.

Gelatin may or may not be present in the suspension. When gelatin is present, the amount is, by weight based on the weight of the water, 2% or less; or 1% or less; or 0.5% or less. Preferred embodiments have little or no gelatin. Preferably the amount of gelatin is sufficiently low that the amount of gelatin is, by weight based on the weight of water, 0 to 0.01%; more preferably 0 to 0.001%. More preferably the amount of gelatin is zero.

The suspension may or may not contain boric acid. When boric acid is present, the amount may be, by weight based on the weight of water, 2% or less, or 1% or less, or 0.5% or less. Preferably, the suspension contains little or no boric acid. Preferably, the amount of boric acid in the suspension is sufficiently low that the amount of boric acid is 0 to 0.01% by weight, based on the weight of water; more preferably 0%.

The suspension may or may not contain chromium atoms in any valence state. Preferably, the suspension contains little or no chromium atoms. Preferably, the amount of chromium atoms in the suspension is sufficiently low that the amount of chromium atoms is, by weight based on the weight of the suspension, 0 to 0.01%, more preferably 0%.

A preferred use for the suspension is as the starting point for a process of suspension polymerization.

Polymerization conditions involve conditions in which the initiator forms sufficient free radicals to initiate the polymerization process. For example, when a thermal initiator is used, polymerization conditions involve establishing a temperature above 25° C. that is high enough for a significant fraction of the initiator molecules to decompose to form free radicals. For another example, if a photoinitiator is used, polymerization conditions involve exposing the initiator to radiation of sufficiently low wavelength and of sufficiently high intensity for a significant fraction of the initiator molecules to decompose to form free radicals. For another example, when the initiator is a redox initiator, polymerization conditions involve the presence of sufficiently high concentration of both the oxidant and the reductant such that a significant number of free radicals are produced. Preferably, a thermal initiator is used. Preferably, polymerization conditions involve temperature of 50° C. or higher; more preferably 65° C. or higher; more preferably 75° C. or higher. Preferably, when a thermal initiator is used, the suspension is provided at a temperature or a temperature range that falls within the range of 15° C. to 30° C., and then the temperature is raised to polymerization conditions.

In conducting the polymerization process, various conditions, such as, for example, mechanical agitation, temperature, pH, or some combination thereof, may be changed during the process.

Preferably, the polymerization process is a vinyl polymerization process. Preferably, polymerization takes place inside the droplets. Preferably the polymerization process is a suspension polymerization process.

Preferably, the polymerization process results in a polymeric composition. Preferably, the polymeric composition contains polymeric particles. Polymeric particles are particles that are solid at 25° C. and that contain polymer in the amount, by weight based on the weight of the polymeric particles, of 80% or more; preferably 90% or more; more preferably 95% or more.

Preferably the polymeric particles have volume average particle size of 100 μm to 1,500 μm.

Preferred polymers in the polymeric particles are the polymers formed by free radical polymerization of the preferred monomers described above. Preferably the polymer contains polymerized units of vinyl monomer in the amount, by weight based on the weight of the polymer, of 25% or more; more preferably 50% or more; more preferably 75% or more; more preferably 90% or more.

The present invention is not limited to any specific theory. The following discussion may serve to illustrate some of the ideas that may be relevant to the present invention.

Once a distribution of droplet sizes is set in the suspension of organic droplets in an aqueous medium, it is often desirable, and sometimes necessary, to preserve this size distribution though a polymerization process. This is particularly important in systems in which the suspension droplet size distribution is very uniform, such as when the droplets are formed by a jetting process.

The key attributes of an aqueous phase needed to preserve the suspension size distribution are 1) sufficient protection of the droplet surfaces to prevent direct organic-organic contact—and thus coalescence—between droplets and 2) sufficient interfacial energy and surface characteristics to minimize the formation of 'new' surface—and thus sheardown of a given droplet into smaller droplets—under a shear field.

For any given system, there is usually a balance between these two attributes. Protection against coalescence usually improves as the concentration of an aqueous soluble, protective polymer increases, as more of the polymer goes to the surface of the droplets. This improves protection by providing more steric resistance to direct droplet-droplet contact. But at the same time, an increased surface concentration of protective polymer tends to decrease interfacial energy, resulting in more likelihood of sheardown.

Agitation system design can have an impact on this trade-off, as systems having maximum 'flow' (the more flow, the more 'separated' the droplets will be, minimizing collision frequency and thus coalescence) and minimum shear (minimizing sheardown) are desirable. But there is a practical limit to this approach, as the agitation system has requirements other than size distribution (mainly heat transfer and product quality). For systems where preservation of a suspension size distribution (especially a uniform size distribution) is desirable and/or necessary, the chemistry needs to be optimized to the greatest degree possible between minimizing both coalescence and sheardown.

Development of a surface 'structure' is one approach to attain this optimized balance. Formation of a 'crosslinked', or 'complexed' layer around an entire droplet should improve protection vs. coalescence relative to an uncrosslinked system of individual polymer chains at the droplet surface—the mobility of polymer at a given location would be restricted by the network, leading to less likelihood of direct droplet-droplet contact. At the same time, if the network morphology is such that the polymer is flexible (vs. rigid), it can be envisioned that the surface under a shear field would be more likely to deform than to 'break apart'.

Development of this type of polymer network is now known to occur via the interaction of polyvinyl alcohol and boric acid/borate. This chemistry, carried out in water, appears to result in precipitation of a very deformable, 'sticky' polymer phase. The approach of this invention is to produce this type of polymer, but at the surface of a droplet and not in the bulk aqueous phase. The means by which this has been accomplished is to add an organic soluble boronic acid to the organic phase. Some portion of the boronic acid would be expected to present at the droplet interface, where crosslinking of PVOH can occur.

The following are examples of the present invention.
The following materials were used:
DI water=deionized water
CMMC=carboxymethyl methylcellulose
PVOH1=SelVol™ 523 polyvinylalcohol, 87 to 89% hydrolyzed, degree of polymerization 1000 to 1500, from Sekisui Specialty Chemicals
PVOH2=SelVol™ 540 polyvinylalcohol, 87 to 89% hydrolyzed, degree of polymerization 1600 to 2200, from Sekisui Specialty Chemicals
DVB=divinyl benzene (purity 63% by weight)
BPO=benzoyl peroxide (purity 75% by weight)
Styrene (purity >99%)
VPBA=4-vinylphenyl boronic acid
Interfacial Tension Test Compositions were subjected to an interfacial tension test (IFT) as follows.

Interfacial tension tests were performed with Kruss EasyDyne Model K20 tensiometer (DuNuoy Ring Method). A dish of diameter at least twice the diameter of testing ring of the instrument was provided. A layer of aqueous solution deep enough to fully cover the testing ring was placed in the dish, and the testing ring was lowered until it was barely submerged in the aqueous solution. Organic solution was slowly poured on top of the aqueous solution to create a layer of organic solution resting on top of the aqueous solution. The sample was allowed to equilibrate, and then the dish was lowered. The force needed to maintain the position of the ring was used to measure the interfacial tension, which is reported in dynes per centimeter, or d/cm. Also, observations were made of the behavior of the sample during the lowering of the dish. Categories of behaviors observed were as follows:

a) Normal: normal behavior for an IFT test; ring pulls through the aqueous/organic interface and then the interface detaches from the ring at some very short distance into the organic layer. When the top surface of the organic layer has been lowered below the ring, no structures are attached to the ring.

b) Membrane: As the dish was lowered, the interface between the aqueous solution and the organic solution behaved like a membrane that did not break. As the ring traveled through the layer of organic solution, the apparent membrane remained attached to the ring and draped over the ring to remain in contact with the interface between the aqueous solution and the organic solution. This continues even as the organic layer drops below the ring level. The "IFT" value (the force exerted on the ring) remained relatively low (reported as "IFT" in the table below) as the ring traveled through the organic solution layer and then jumped to a relatively high value when the ring passed through the interface between the organic solution layer and air (reported in the "observations" below as "air IFT").

c) Skin: At the end of the test, as the dish was being lowered, one or sometimes several strings could be seen adhered to the ring. These strings, while very thin (estimate less than 100 μm) can be as much as 3-4 cm in length. The strings sometimes extend from the ring to the edge of the container holding the aqueous and organic solutions. The presence of strings was almost always seen when the 'Membrane' behavior was observed while the IFT determination was in progress.

d) Precipitate: white precipitate formed in aqueous layer before starting the test. In some cases, the ring did not pull through the monomer layer.

The membrane/skin behavior is desirable, as it indicates a highly 'stretchable', deformable surface that will be resistant to droplet coalescence via a strongly adhered layer (or multi-layer) of high molecular weight polymer. It is also anticipated that this behavior will lead to resistance to sheardown under stress—the droplet surface will stretch, as opposed to rupturing to form two or more smaller droplets from one larger one.

PREPARATIVE EXAMPLE 1: ORGANIC SOLUTIONS

Organic solutions were prepared by combining the following ingredients:

| Organic Solution Ingredients: | |
| --- | --- |
| Ingredient | amount[1] |
| Styrene | balance[2] |
| DVB | 9.6% |
| BPO | 0.3% |
| sulfur | 0.0052 |
| boronic acid | variable |

Note:
[1]% by weight based on the total weight of droplet ingredients.
Note:
[2]to make up 100% by weight

PREPARATIVE EXAMPLE 2: AQUEOUS SOLUTIONS

Aqueous solutions were prepared by combining the following ingredients:

| Aqueous Solution Ingredients | |
| --- | --- |
| ingredient | amount[3] |
| DI water | balance[5] |
| CMMC | variable |
| PVOH[4] | 0.06% |
| NaNO$_2$ | 0.016% |

Note:
[3]% by weight based on the total weight of aqueous phase ingredients
Note:
[4]either PVOH1 or PVOH2
Note:
[5]to make up 100% by weight

EXAMPLE 3: INTERFACIAL TENSION TESTING

The interface between a layer of organic solution and a layer of aqueous solution was tested using the IFT procedure described above. It is contemplated that a strong interface in this test would indicate that the same combination of aqueous solution and organic solution would form a good suspension of droplets of organic solution in aqueous solution. "Approx." means approximately. The results were as follows:

| Example | % VPBA | IFT (d/cm) | Observations |
| --- | --- | --- | --- |
| 3-2 | 0.0001 | approx. 12 | normal |
| 3-3 | 0.001 | approx. 12 | normal |
| 3-4 | 0.003 | 7.2 | skin formed |
| 3-5 | 0.005 | 6.7 | membrane and skin; air IFT 46.8 d/cm |
| 3-6 | 0.0075 | 4.8 | membrane and skin; air IFT 41.9 d/cm |
| 3-7 | 0.01 | 4.9 | membrane and skin; air IFT approx. 48 d/cm |
| 3-8 | 0.015 | 6.5 | membrane and skin; air IFT 45.3 d/cm |
| 3-9 | 0.02 | 10.5 | precipitate; ring did not pull through the monomer layer |
| 3-10 | 0.025 | 11.3 | precipitate; ring did not pull through the monomer layer |
| 3-11 | 0.03 | 11.4 | precipitate; ring did not pull through the monomer layer |
| 3-12 | 0.05 | 12.2 | precipitate |
| 3-13 | 0.1 | 10.2 | precipitate |

Further IFT test results were as follows:

Examples 3-2 and 3-3 showed that with too little amount of boronic acid, the desired strengthening of the interface does not occur. All the other examples showed useful behavior, at least initially. Examples 3-4 through 3-11 showed especially desirable behavior, with the interface between the organic solution and the aqueous solution forming a very strong membrane-like layer.

EXAMPLE 4: PREPARATION OF SUSPENSIONS WITHOUT CMMC

During the preparation of the suspension, some individual ingredients or partial mixtures were, if necessary, temporarily heated to achieve good mixing, but the suspension was provided at approximately 25° C.

Using the organic and aqueous solutions described in Examples 1 and 2, suspensions of droplets of organic solution suspended in a medium of aqueous solution were made using the jetting procedure described in U.S. Pat. Nos. 4,444,960 and 4,623,706. This procedure consistently produces droplets with volume-average diameter of 480 μm and uniformity coefficient less than 1.1. In the resulting suspension, the volume fraction of droplets of organic solution was 0.4.

A thin layer of each suspension was placed on a glass slide and examined by optical microscopy to produce a photomicrograph. The photomicrographs were manually examined. The droplets of diameter of approximately 400 μm to 600 μm ("normal" droplets) were counted, as were the droplets having diameter less than approximately 250 μm ("small" droplets). The number of small droplets per 100 normal droplets is reported herein as the "small count". No CMMC was used. PVOH type was PVOH1. "Ex." means Example. Examples with designation ending in "C" are comparative. Results were as follows:

| Example | % VPBA | Diameter[1] (μm) | Small Count |
| --- | --- | --- | --- |
| 4-1C | 0 | 480 | 118 |
| 4-2 | 0.01 | 480 | 3 |

Note:
[1]volume-average diameter, known from the consistent results of the jetting procedure.

As the small count shows, Example 5-2 has a far more uniform distribution of droplet sizes than Comparative Example 5-1C.

EXAMPLE 5: SUSPENSIONS WITH CMMC

During the preparation of the suspension, some individual ingredients or partial mixtures were, if necessary, temporarily heated to achieve good mixing, but the suspension was provided at approximately 25° C.

Using the organic and aqueous solutions described in Examples 1 and 2, suspensions of droplets of organic solution suspended in a medium of aqueous solution were made using the jetting procedure described in U.S. Pat. Nos. 4,444,960 and 4,623,706. In the resulting suspension, the volume fraction of droplets of organic solution was 0.4.

Monomer droplet size was volume-average diameter of 480 μm, resulting from the jetting procedure.

Jetting was performed at approximately 25° C., and the suspension was held with stirring for approximately 20 hours. Then the temperature was raised to 80° C. and held at a temperature between 80° C. and 100° C. for 10 hours, and then the composition was cooled to approximately 25° C. The composition underwent a process of suspension polymerization, converting the monomer droplets to polymer particles.

Size of the polymer particles was analyzed by performing optical microscopy to form digital images of the particles, then performing image analysis to determine the diameter of each particle, and then calculating the desired statistics from the data base of observed diameters. Results were as follows:

| Ex | % VPBA | % CMMC | PVOH type | HMS (μm) | UC | LT355 |
|---|---|---|---|---|---|---|
| 5-1 | 0.01 | 0.15 | PVOH2 | 468 | 1.06 | 1.66 |
| 5-2 | 0.01 | 0.15 | PVOH2 | 466 | 1.06 | 3.45 |
| 5-3 | 0.01 | 0.15 | PVOH2 | 477 | 1.07 | 0.41 |
| 5-4 | 0.0025 | 0.15 | PVOH2 | 469 | 1.11 | 4.35 |
| 5-5C | 0 | 0.23 | PVOH1 | 443 | 1.7 | 15.6 |
| 5-6C | 0 | 0.23 | PVOH1 | 407 | 1.37 | 12.2 |

Examples 5-1, 5-2, and 5-3 are replicate samples. Also, Examples 5-5C and 5-6C are duplicate samples. All of the inventive examples 5-1 through 5-4 have much more uniform particle size distributions (i.e., smaller values of UC and lower values of LT355) than the comparative examples 5-5C and 5-6C. The difference in uniformity between the inventive examples and the comparative examples is considered to be extremely significant; at a production scale, this difference could mean that the inventive process was economically viable while the comparative process was prohibitively expensive.

The invention claimed is:

1. A method of making droplets distributed in an aqueous medium comprising bringing into contact
   (i) an organic solution comprising from 0.003 to 0.03 wt %, based on weight of the organic solution, of 4-vinylphenyl boronic acid, and
   (ii) an aqueous solution comprising polyvinyl alcohol.

2. The method of claim 1, wherein the 4-vinylphenyl boronic acid is present in an amount of 0.0015% to 0.03% by weight based on the weight of the organic solution.

3. The method of claim 1, wherein the polyvinyl alcohol is present in an amount of 0.01% to 0.5% by weight based on the weight of the aqueous solution.

4. The method of claim 1, wherein the organic solution additionally comprises one or more monomers and one or more initiators.

5. The method of claim 1, wherein the organic solution additionally comprises one or more monomers and one or more initiators, and wherein the one or more monomers are present in an amount of 95% to 99.99% by weight based on the weight of the organic solution.

6. The method of claim 1, wherein the organic solution additionally comprises one or more porogens, and wherein the one or more porogens are present in an amount of 10% to 60% by weight based on the weight of the organic solution.

7. The method of claim 6 wherein the organic solution additionally comprises one or more monomers and one or more initiators.

8. The method of claim 7 in which the organic solution comprises from 50 to 98 wt % of one or more vinyl aromatic monomers and from 2 to 50 wt % of one or more multivinyl monomers.

9. The method of claim 8 in which the organic solution comprises from 70 to 96 wt % styrene and from 4 to 30 wt % of one or more multivinyl monomers.

* * * * *